US007603458B1

(12) United States Patent
Sexton et al.

(10) Patent No.: US 7,603,458 B1
(45) Date of Patent: Oct. 13, 2009

(54) SYSTEM AND METHODS FOR PROCESSING AND DISPLAYING AGGREGATE STATUS EVENTS FOR REMOTE NODES

(75) Inventors: John C. Sexton, Grenagh (IE); Paul Bradley, Macroom (IE); Hanna Yehuda, Newton, MA (US); David Barta, West Roxbury, MA (US)

(73) Assignee: EMC Corporation, Hopkinton, MA (US)

( * ) Notice: Subject to any disclaimer, the term of this patent is extended or adjusted under 35 U.S.C. 154(b) by 881 days.

(21) Appl. No.: 10/674,322

(22) Filed: Sep. 30, 2003

(51) Int. Cl.
G06F 15/173 (2006.01)

(52) U.S. Cl. ..................................... 709/224

(58) Field of Classification Search .......... 709/223–224
See application file for complete search history.

(56) References Cited

U.S. PATENT DOCUMENTS

| | | | | |
|---|---|---|---|---|
| 5,819,028 | A * | 10/1998 | Manghirmalani et al. | 714/57 |
| 6,434,626 | B1 * | 8/2002 | Prakash et al. | 709/238 |
| 6,671,776 | B1 * | 12/2003 | DeKoning | 711/114 |
| 6,816,898 | B1 * | 11/2004 | Scarpelli et al. | 709/224 |
| 7,139,819 | B1 * | 11/2006 | Luo et al. | 709/223 |
| 7,181,743 | B2 * | 2/2007 | Werme et al. | 718/104 |
| 7,194,538 | B1 * | 3/2007 | Rabe et al. | 709/224 |
| 7,197,545 | B1 * | 3/2007 | Davie | 709/220 |
| 2003/0125908 | A1 * | 7/2003 | Wynn et al. | 702/186 |
| 2003/0149753 | A1 * | 8/2003 | Lamb | 709/223 |
| 2003/0149762 | A1 * | 8/2003 | Knight et al. | 709/224 |
| 2004/0019457 | A1 * | 1/2004 | Arisha | 702/182 |
| 2004/0019835 | A1 * | 1/2004 | Marisetty et al. | 714/48 |
| 2004/0031030 | A1 * | 2/2004 | Kidder et al. | 717/172 |
| 2004/0037558 | A1 * | 2/2004 | Beshai | 398/57 |
| 2004/0042470 | A1 * | 3/2004 | Cooper et al. | 370/401 |
| 2004/0153844 | A1 * | 8/2004 | Ghose et al. | 714/42 |
| 2004/0199618 | A1 * | 10/2004 | Knight et al. | 709/223 |
| 2004/0210791 | A1 * | 10/2004 | Akagawa et al. | 714/2 |
| 2006/0173992 | A1 * | 8/2006 | Weber et al. | 709/224 |
| 2006/0212751 | A1 * | 9/2006 | Yamamoto et al. | 714/6 |

OTHER PUBLICATIONS 60427294.111802 Mazu Networks, Network Traffic Secutiry Provisional Application for patent cover sheet. Massimiliano Poletto and Robert Nader. Nazzal, Nov. 18, 2002.*

* cited by examiner

Primary Examiner—Dohm Chankong
Assistant Examiner—Tauqir Hussain
(74) Attorney, Agent, or Firm—Chapin IP Law, LLC; Barry W. Chapin, Esq.

(57) ABSTRACT

A status monitoring and reporting mechanism which distinguishes more significant events and prominently displays events pertaining to nodes, interconnections, and other network entities which may present problems, and to suppresses benign messages which may not require immediate attention, provides an "at a glance" view of overall system health. By processing and displaying aggregate status events from a plurality of agent components to highlight the most severe and critical events from among a large volume of general status events allows an operator to quickly diagnose potential problems before detrimental results occur, and helps maintain a general efficient system health by isolating less efficient areas to allow for timely remedial action prior to failure. Various agents disseminated in a storage area network determine and report status events back to a central server. The server receives, aggregates, and processes the status events to display a status array indicative of overall system health.

39 Claims, 10 Drawing Sheets

SYSTEM AND METHODS FOR PROCESSING AND DISPLAYING AGGREGATE STATUS EVENTS FOR REMOTE NODES

BACKGROUND OF THE INVENTION

In a conventional managed information system, such as a storage area network (SAN) operable to coordinate access to mass storage devices by a set of users, the network (SAN) interconnects a plurality of storage device nodes and associated interconnection nodes. The storage area network includes a variety of nodes for providing mass storage retrieval services to users, such as storage devices (e.g. disc drive arrays), connectivity devices (e.g. switches and routers), and conventional host computers for executing software components called agents for monitoring and controlling the nodes in the storage area network. The resultant infrastructure, therefore, for monitoring and controlling the storage area network, defines a complex array of nodes and interconnections.

Management of the storage area network infrastructure presents a formidable task. The multitude of nodes and interconnections between the various nodes present a substantial monitoring and control task for tracking throughput, identifying bottlenecks, and pinpointing failures, for example. In a typical conventional managed information services network, a network management application, such as a Simple Network Management Protocol (SNMP) based application, assist operators and users in gathering feedback from the network and performing diagnostic activities for isolating problem areas, performing remedial action, and improving efficiency of the conventional network infrastructure.

SUMMARY

In a conventional information services network, status monitoring and reporting mechanisms typically monitor the various nodes and interconnections in the network. Such a conventional network status reporting mechanism may include deployment of a number of software monitoring components, such as SNMP agents, on various nodes in the network. The SNMP agents communicate with a conventional control node, such as a central server, via a series of messages. The conventional monitoring components poll or interrogate various potential failure and/or throughput points for periodic status. The monitoring components report the status to the central server, typically by a transmitted message or series of messages. The conventional central server then performs an appropriate response to the status messages based on the circumstances. Certain events may be informational, and require no remedial action. More serious events may require operator intervention. Determination of the severity of the circumstances presented by an conventional event or series of events may be critical to continued, efficient, system operation.

Often, particularly in a large information services network, the number of monitoring components and resultant messages can be substantial. Deploying a large number of monitoring components, such as network agents, each recording and reporting a stream of periodic messages concerning status of a particular part of the network, may result in an unwieldy message volume. Typical conventional reporting mechanisms write such a stream of status events to a log file and, optionally, print them on a event logger printer. However, it can be cumbersome to manually query and/or observe the event log to detect, diagnose, and prevent problems. The magnitude of volume presented over even a short reporting period tends to shroud more significant or deviant status events around more minor and benign status events. Accordingly, an operator or user may not become aware of an impending problem until after detrimental results occur, and event then it may be difficult to diagnose the cause from among the voluminous event log that may have accrued.

It would be beneficial, therefore, to provide a status monitoring and reporting mechanism which distinguishes more significant events and prominently displays events pertaining to nodes, interconnections, and other network entities which may present problems, and to suppress or avoid more benign messages which may not require immediate attention. A method of processing and displaying aggregate status events from a plurality of agent components which highlights the most severe and critical events from among a large volume of general status events allows an operator or user to quickly diagnose potential problems before detrimental results occur, and helps maintain a general efficient system health by isolating less efficient areas to allow for timely remedial action prior to failure.

Particular embodiments of the invention are therefore based, in part, on the observation that expedient, accurate determination of a general overall system perspective on the health, performance, and capacity of a multi-node system tends to be prone to high overhead, stale data, and accuracy of deterministic conclusions. In particular configurations of the invention, various agents disseminated in a multi-node system, such as a storage area network, determine and report status events as alert messages back to a central server. The central server receives, aggregates, and processes the status events after storing them in an event repository, such as a status event table or other suitable data structure. The central server processes the events by organizing them into buckets according to event category, and determining a severity level for each event.

The central server orders the events by event category for each node, in which the server computes a severity scale aggregating the status events corresponding to each node for that event category. The severity scale employs a severity scale metric which ranks nodes in order of overall severity, with the nodes having the most critical overall status ranked first. The central server then displays, via a console driven GUI, the severity ranking for each event category type, simultaneously as a status array on a GUI output display. The status array includes a chart entry for each category type, and for each category type, a node entry including a histogram (i.e. bar chart) for each node according to the severity ranking. The status array therefore lists simultaneously, for each category type, the nodes having the status events of the greatest severity. An operator or user may then employ the GUI via a point-and-click interface to select a particular node of interest and request, or drill down, an expanded status (i.e. event detail) of that node to identify and resolve problem areas.

Therefore, while conventional status monitoring and reporting tends to provide a sparse volume of largely informational data, the method disclosed herein organizes the status events indicative of alerts and notifications according to event categories which are salient indicators of system health. Within each event category, the nodes for which the most severe status severe events are occurring are displayed first, in a ranking from nodes having the most severe events down to nodes with less severe events. Since the chart entries for each category type are shown simultaneously, the display shows a simultaneous view of the nodes experiencing the most severe events in salient event categories.

In this manner, the central server supports a GUI for aggregating and reporting notifications and alerts as status events in a single window, therefore providing a view of system environment (i.e. SAN) health, performance and capacity "at a glance." In a particular implementation, discussed further below, the server tracks these three main areas of the system environment. The GUI displays chart entries as follows. For overall system environment health, the chart entries display the status events (alerts) for the selected storage systems, hosts and connectivity components, the status of the system environment infrastructure components and agents, the number of users logged in to the system environment, and the number of alerts for infrastructure components and agents. For system performance, the chart entries display the performance of storage systems, hosts, and connectivity devices, and for system capacity, the chart entries show the capacity status of storage systems and hosts.

In further detail, the method for gathering and monitoring the simultaneous status of nodes in a storage area network includes receiving alert messages corresponding to status events in the storage area network at the server, in which each status event has a corresponding event category and severity value indicative of the alert or notification to which it corresponds. A correlator in the server determines the category and severity value, and passes each alert message to an aggregator to aggregate the alert messages according to event category and severity value to generate a category specific severity ranking (per SAN node, or manageable entity) of the alert messages. The console displays a status array having a plurality of chart entries on a GUI screen, in which each chart entry corresponding to alert messages of a particular event category. Each chart entry has a node entry, or row, for each node having status attributable to the alert messages in that event category. The console displays, within each of the chart entries, node entries having a status event for that chart entry. The console displays the node entries in the chart entry according to the severity ranking, for each node entry, indicative of a severity scale (i.e. histogram bar) of status for the corresponding effected node.

The server, in displaying each of the chart entries, accumulates events of each of a plurality of severity levels, in which the severity scale for a node entry is an enumeration, or aggregation, of events received for each of the plurality of severity levels within the event category. The console then displays the enumeration for each node entry within the chart entry containing the node entries ordered by the severity ranking. In the exemplary configuration shown, the enumeration is a histogram having a magnitude based on the severity scale and a quantity of events within each severity level within the severity ranking. The histogram has a plurality of visually overlapping, or concatenated, elongated bar segments, in which each elongated bar segment corresponding to a particular severity level.

The server initializes by discovering a topology of nodes in the SAN, in which the alert messages correspond to status events for each of a plurality of selected nodes in a selection tree indicative of the nodes in the SAN. The selection tree therefore includes all known (discovered) nodes for selectable inclusion in the status array.

Therefore, each event (alert) has a corresponding node, a severity value and a category. Each node in a category receives a node entry (i.e. row) in the chart entry for that category. Each of the status events in the same category for a particular node are used to compute a severity scale from the aggregate severity values. The severity ranking is an ordered list of the computed severity scale for each of the nodes in a chart entry.

The console displays the chart entries with a horizontal magnitude axis indicative of a relative range of the quantity of status events within each of the severity levels corresponding to a plurality of node entries reflected in the chart entry, i.e. covering the range of the severity scale. Each chart entry also has a vertical manageable entity axis arranged, for each node, according to an increasing severity scale value denoting the severity ranking for each node included in the chart entry. The server computes the severity scale for each node according to a predetermined severity metric The severity level corresponds to a threshold value which identifies a triggering point of an event having the corresponding severity level. Each event has a set of threshold values, the threshold values indicative of a quantitative metric triggering the particular event and severity, such as a numeric limit. After user input, the server processes and propagates the threshold values to the remote agents, which are then operable to analyze nodes and determine when a particular metric satisfying a triggering threshold is attained and generate the corresponding event.

Filtering and selection options are selectable by a user or operator for adjusting or tuning the status event messages reported by the agents, including filtering the status events to compute a subset of elected events determined in response to predetermined filtering logic at the agents processing the elected events. Agents may also selectively suppress events of a particular category and severity in response to a user or operator request. Further, the user or operator defines a selection of at least one node in a hierarchical arrangement of nodes for use as a selection group, or object group. The server performs the aggregation and display of the status array in relation to the selection group in order to display the simultaneous status of nodes in a storage area network, therefore enabling the operator or user to assess the overall status "at a glance" of the GUI display.

In a particular exemplary implementation, the nodes include manageable entities responsive to the server in a SAN and further including storage entities, connectivity entities, and database entities.

In another particular arrangement, the chart entries in the status array includes chart entries directed to manageable entity health, manageable entity performance, and storage system capacity. In the particular exemplary arrangement shown, the status array is an N by M matrix of the plurality of chart entries including i) a general alert chart entry displaying alert status of managed entities in the storage area network; ii) a storage chart entry indicating alert status of managed storage entities in the storage area network; iii) a host chart entry indicating alert status of managed host entities in the storage area network; and iv) a connectivity chart entry indicating alert status of managed connectivity entities in the storage area network.

Further, a user or operator may "drill down" to ascertain a more detailed status of a particular node displayed in the chart entry. The server receives a user input corresponding to selection of a node entry from among the node entry, displays an expanded menu of status options for the selected entry; and displaying an expanded status report corresponding to the expanded menu input.

The invention as disclosed above is described as implemented on a computer having a processor, memory, and interface operable for performing the steps and methods for monitoring an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Particular embodiments of the invention provide a method for various agents disseminated in a multi-node system, such as a storage area network, to determine and report status events as alert messages back to a central server. The central server receives, aggregates, and processes the status events after storing them in an event repository, such as a status event table or other suitable data structure. The central server processes the events by organizing them into buckets according to event category, and determining a severity level for each event.

The central server then orders the events by event category for each node, in which the server computes a severity scale aggregating the status events corresponding to each node for that event category. The severity scale employs a severity scale metric which ranks nodes in order of overall severity, with the nodes having the most critical overall status ranked first. The central server then displays, via a console driven GUI, the severity ranking for each event category type, simultaneously as a status array on an output display. The status array includes a chart entry for each category type, and for each category type, a node entry including a histogram (i.e. bar chart) for each node according to the severity ranking. The status array therefore lists simultaneously, for each category type, the nodes having the status events of the greatest severity. An operator or user may then employ the GUI via a point-and-click interface to select a particular node of interest and request, or drill down, an expanded status of that node to identify and resolve areas of particular problems.

In this manner, the server supports a GUI for aggregating and reporting notifications and alerts as status events in a single window, therefore providing a view of system environment (i.e. SAN) health, performance and capacity "at a glance." In a particular implementation, discussed further below, the server tracks these three main areas of the system environment. The GUI displays chart entries as follows. For overall system environment health, chart entries display the active alerts for the selected storage systems, hosts and connectivity components, the status of the system environment infrastructure components and agents, the number of users logged in to the system environment, and the number of alerts for infrastructure components and agents. For system performance, the chart entries display the performance of storage systems, hosts, and connectivity devices, and for system capacity, the chart entries show the capacity status of storage systems and hosts.

Figure 1:
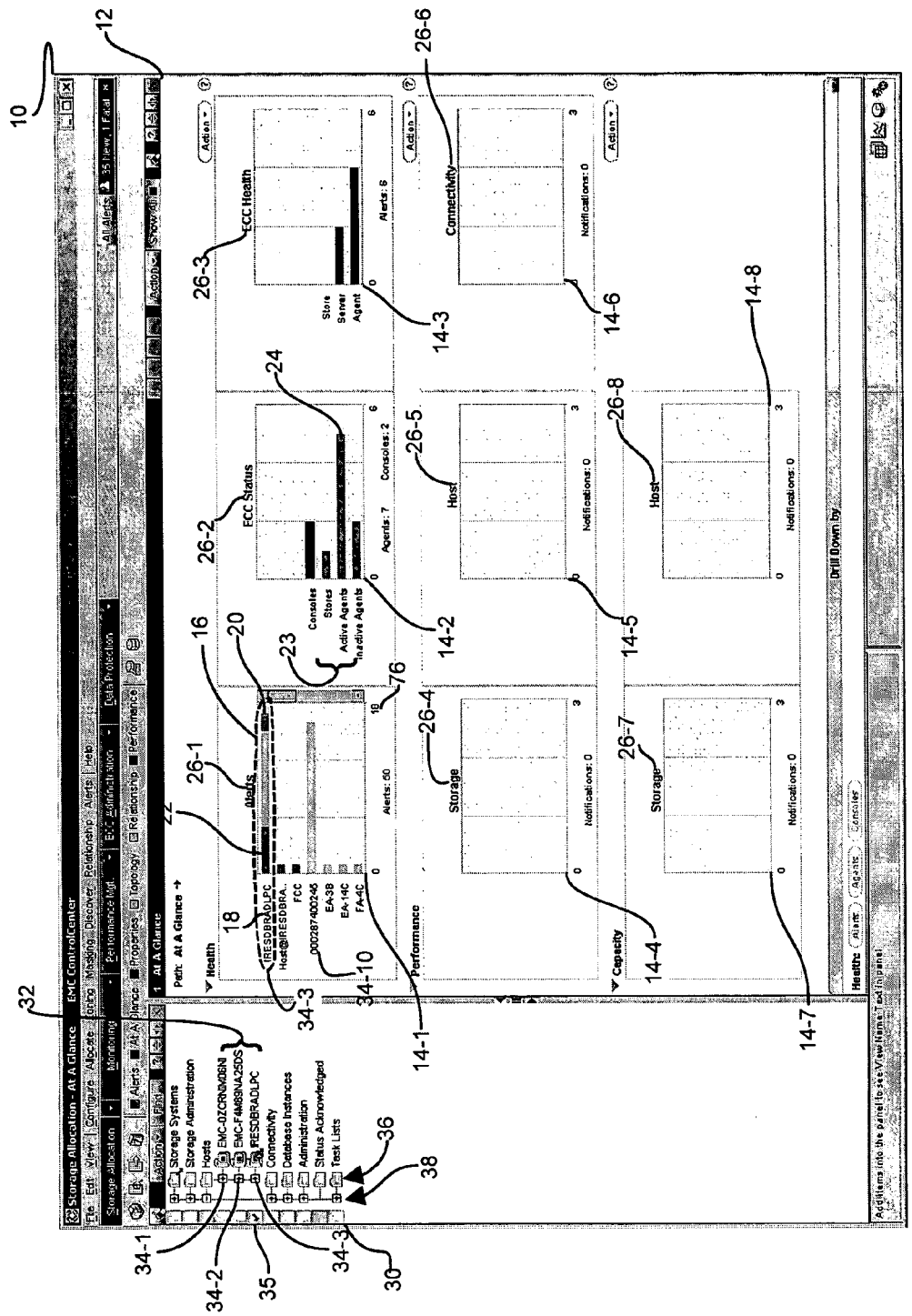
FIG. 1 is a screen diagram of a graphical user interface (GUI) incorporating the features of a particular configuration of the invention as defined herein.

FIG. 1 is a screen diagram of a graphical user interface (GUI) incorporating the features of a particular configuration of the invention as defined herein. Referring to FIG. 1, a screen display 10 includes a status array 12 of chart entries 14-1-14-8 (14 generally). Each chart entry 14 includes a plurality of node entries 16 including a node name 18 and a node specific value 20 in consecutive rows. The chart entries each correspond to a particular event category type 26-1-26-8 (26 generally) The screen 10 also includes a hierarchical selection tree 30 of available nodes 34-1-34-N (34 generally). Each of the node entries 16 corresponds to a node 34 in the selection tree 30, as will be discussed further below. Further, the selection tree 30 is a hierarchical expansion in which entries expand and collapse for encapsulation within other entries via expansion buttons 38, as is known to those of skill in the art. Accordingly, the selection tree 30 includes a hierarchy of icons 36, expandable to individual nodes 34. a selected icon 35 is a checkbox icon which indicates which nodes 34 to include in the selection set. A node 34 is an entity for which status may be ascertained and reported, i.e. an entity which can trigger an alert. Accordingly, a node may be a manageable entity within a storage area network, a computer operating as a host within a storage area network, a software agent component executing on a host, or other atomic entity as will be discussed further below.

In operation, a plurality of nodes 34 define a managed information network (FIG. 2, below) such as a storage area network. The nodes 34 report status events as alerts within a particular event category type 26 (category type). The screen 10 shows the status array 12 simultaneously for each category type 26 along with a plurality of node entries 16. The node entries 16 include nodes 18 for which status is most imperative, according to an aggregation of the status events for that node 18, discussed further below.

Figure 2:
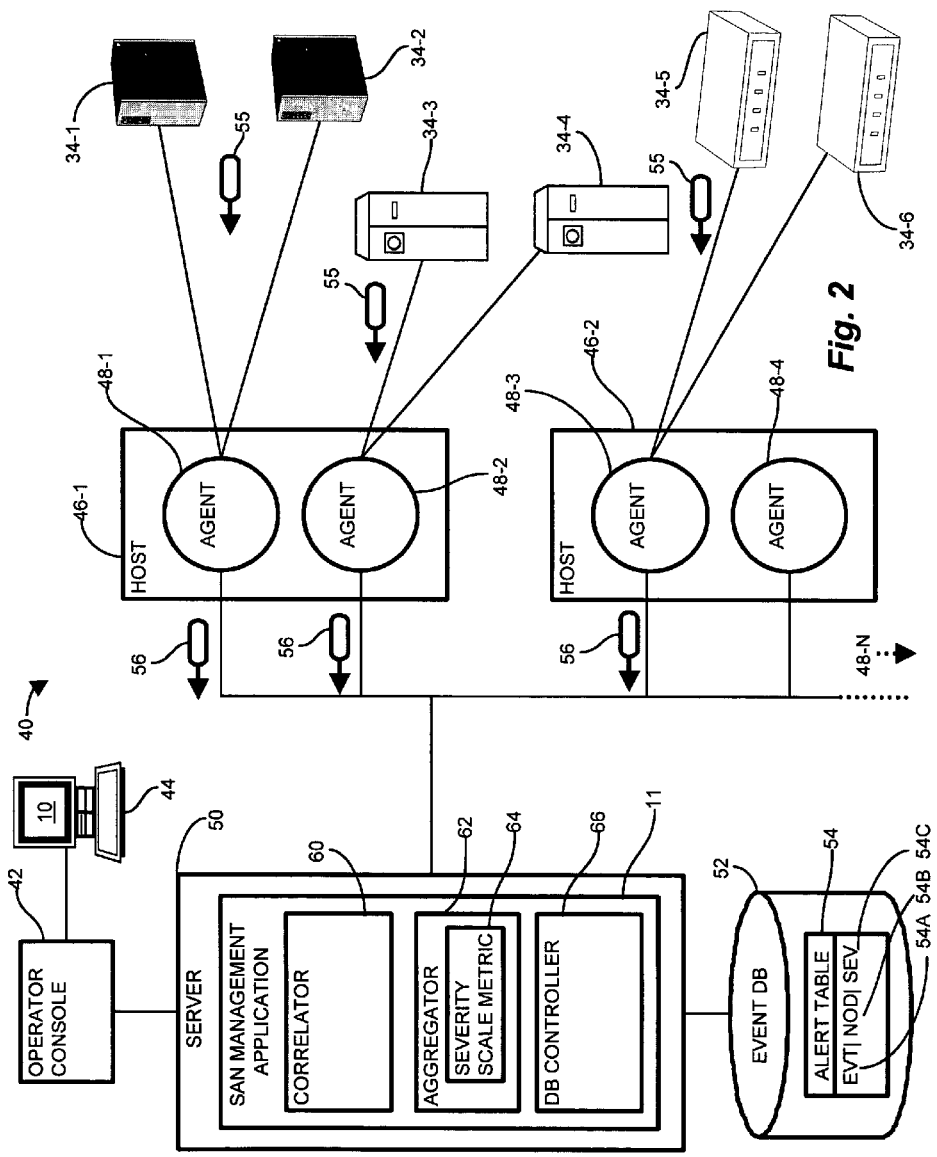
FIG. 2 is a block diagram of a computer system suitable operable to employ the GUI screen of FIG. 1 for use with the present invention.

FIG. 2 is a block diagram of a computer system operable to employ the GUI screen of FIG. 1 for use with the present invention. In a managed information network such as a storage area network 40, a plurality of manageable entity nodes 34-1-34-6 (manageable entities) each connect to a respective agent component 48-1-48-3 (48-N generally). The agent components 48-N (agents) are software processes executing on a host 46-1-46-2 (46 generally) for monitoring and controlling the manageable entities 34-N. Each of the hosts 46 couples to the server 50 for receiving monitoring and control instructions and for reporting status events 56 corresponding to alerts and notifications 55 generated by the nodes 34. The server 50 further couples to a user console 42, for interacting with a user via a user terminal device (i.e. visual display CRT, LCD, etc.) 44 displaying the GUI screen 10, and to an event database (DB) 66. The server 50 further includes a correlator 60, an aggregator 62 having severity scale metric logic 64, and a database controller 66, for receiving, processing, and aggregating the status event messages 56. The database 52 includes an alert table 54 for logging the status event messages 56, having fields for event 54A, node 54B, and severity value 54C.

Figure 3:
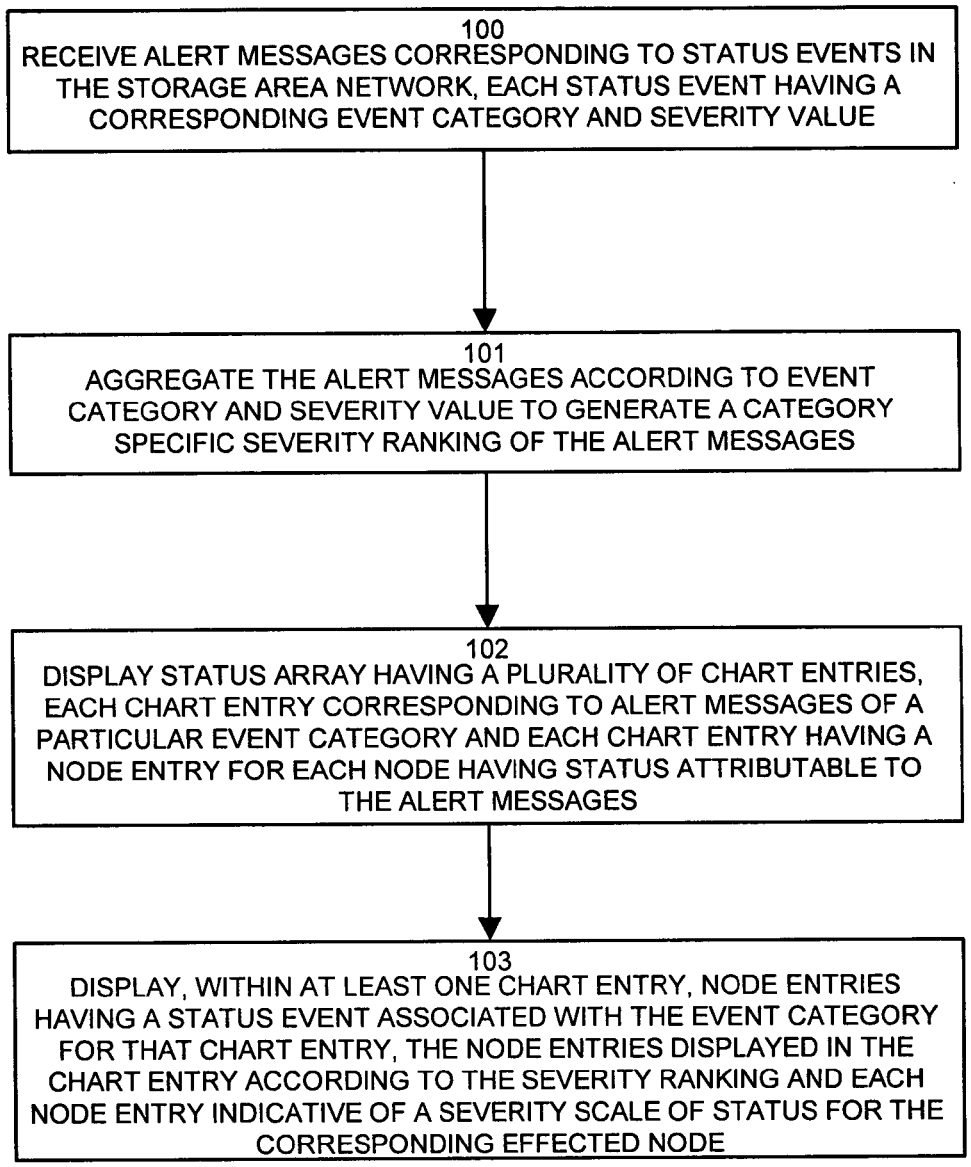
FIG. 3 is a flowchart of aggregating, processing, and reporting status events in the system of FIG. 2.

FIG. 3 is a flowchart of aggregating, processing, and reporting status events in the system of FIG. 2. Referring to FIGS. 1, 2 and 3, the method for gathering and monitoring the simultaneous status of nodes 34 in the storage area network 40 is shown. At step 100, the correlator 60 in the server 50 receives status event messages 56 from alerts and notifications 55 generated by nodes 34 in the storage area network 40, in which each status event 56 has a corresponding event category 26 and severity value 54C. The correlator 62, therefore, receives the stream of messages 56 from the agents 48 in the storage area network 40 and identifies the event category 26, the severity value 54C, and the node 34 generating the event message 56.

At step 101, the aggregator 62 aggregates the status event messages 56 according to event category 26 and severity value 54C to generate a category specific severity ranking 23 of the alert messages 56. A severity scale metric 64 includes logic operable on the severity values 54C of the incoming messages 56 to compute a severity scale 24 for ranking the nodes 34 having the most severe status. The severity scale metric 64 weighs the number of messages 56 of each severity level 22 (below) to encompass, for example, fewer events but of a greater severity. In the exemplary system shown, a single status event of a greater (more severe) severity ranks 23 a greater severity than any number of a lesser severity value 22. The exemplary severity levels 22 include the following: 1=fatal; 2=critical; 3=warning; 4=minor (error) and 5=informational, discussed further below with respect to FIG. 10. Within the same severity level 22, nodes 34 with more status events 56 attributable to that severity level 22 rate a security ranking 23 greater than nodes 34 with fewer status events 56 of that severity level 22. For example, a single status event of critical (2) level ranks the affected node higher than a node with, say, five warning (3) level event messages 56.

At step 102, the server 50 invokes the user console 42 to displaying the status array 12 on the GUI window 10 having a plurality of chart entries 14-1-14-8, in which each chart entry 14 corresponds to alert messages 56 of a particular event category 26. Each chart entry 14 has a node entry 16, or row, for each node 34 having status events attributable to the alert messages 56. Each chart entry 14 is a row having a histogram bar 20 including a node name 18 for displaying the relative magnitude of the severity for that node 18 in relation to other nodes 34.

At step 103, the GUI displays, for each chart entry 14 for which a node 34 has a status event associated with the event category 26 for that chart entry (i.e. each node generating a status (alert) message 56 for that category 26), the node entries 16 according to the severity ranking 23. For each node entry 18, the severity ranking 23 is indicative of the computed severity scale 24 of status events for the corresponding effected node 34 according to the node name 16. Therefore, the GUI 10 displays a listing according to the ranking from the aggregator 62 of nodes 34 having the most severe (imperative) number of events (alerts), and thus the highest computed severity scale 24.

Figure 4:
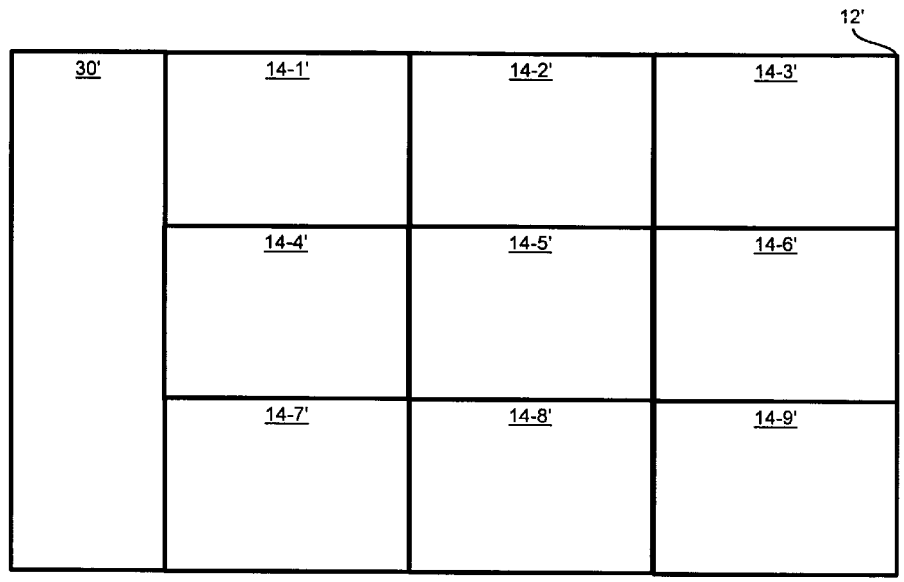
FIG. 4 shows a block diagram of the screen display fields of the GUI of FIG. 1.

FIG. 4 shows a block diagram of the screen display fields of the GUI of FIG. 1. Referring to FIGS. 1 and 4, the screen 10 has two window portions, a status array portion 12' including the status array 12 and a selection tree portion 30' including the selection tree 30. The status array portion 12' further subdivides into a plurality of chart entry portions 14-1'-14-N' for each of the chart entries 14-1-14-N, each corresponding to a particular event category 26-M.

In operation, the status array portion 12' displays the status array 12, and the selection tree portion 30' displays the selection tree 30 including the various nodes 34-N and icons 36 at a current state of expansion depending on the expansion buttons 38. Each of the chart entry portions 14' displays a particular chart entry 14 for status of the corresponding event category 26-M, discussed further below with respect to FIG. 5. In a particular configuration, the event categories 26-M shown in the chart entries 14-1-14-8 include system health alerts 26-1, system server status 26-2, system server health 26-3, storage performance 26-4, host performance 26-5, connectivity performance 26-6, storage capacity 26-7 and host capacity 26-8.

Figure 5:
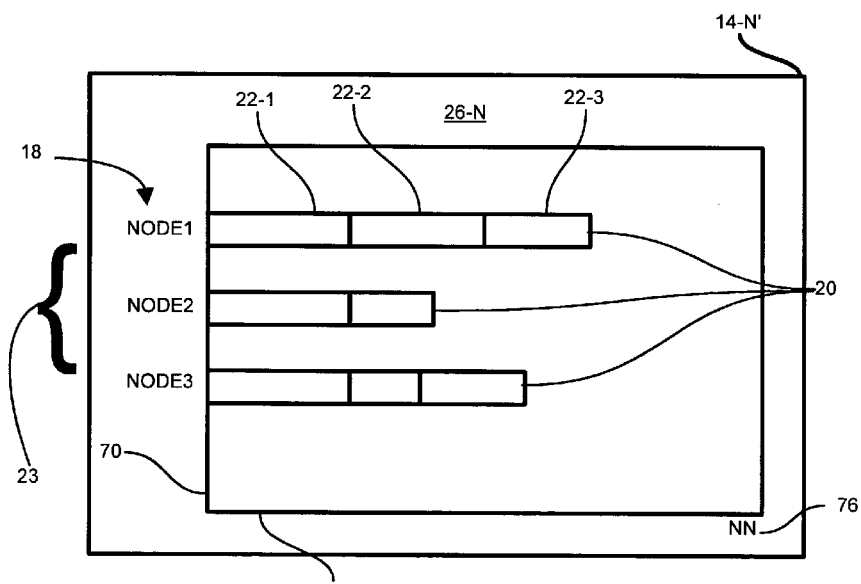
FIG. 5 shows a block diagram of a chart entry in the screen display of FIG. 4
Figure 6:
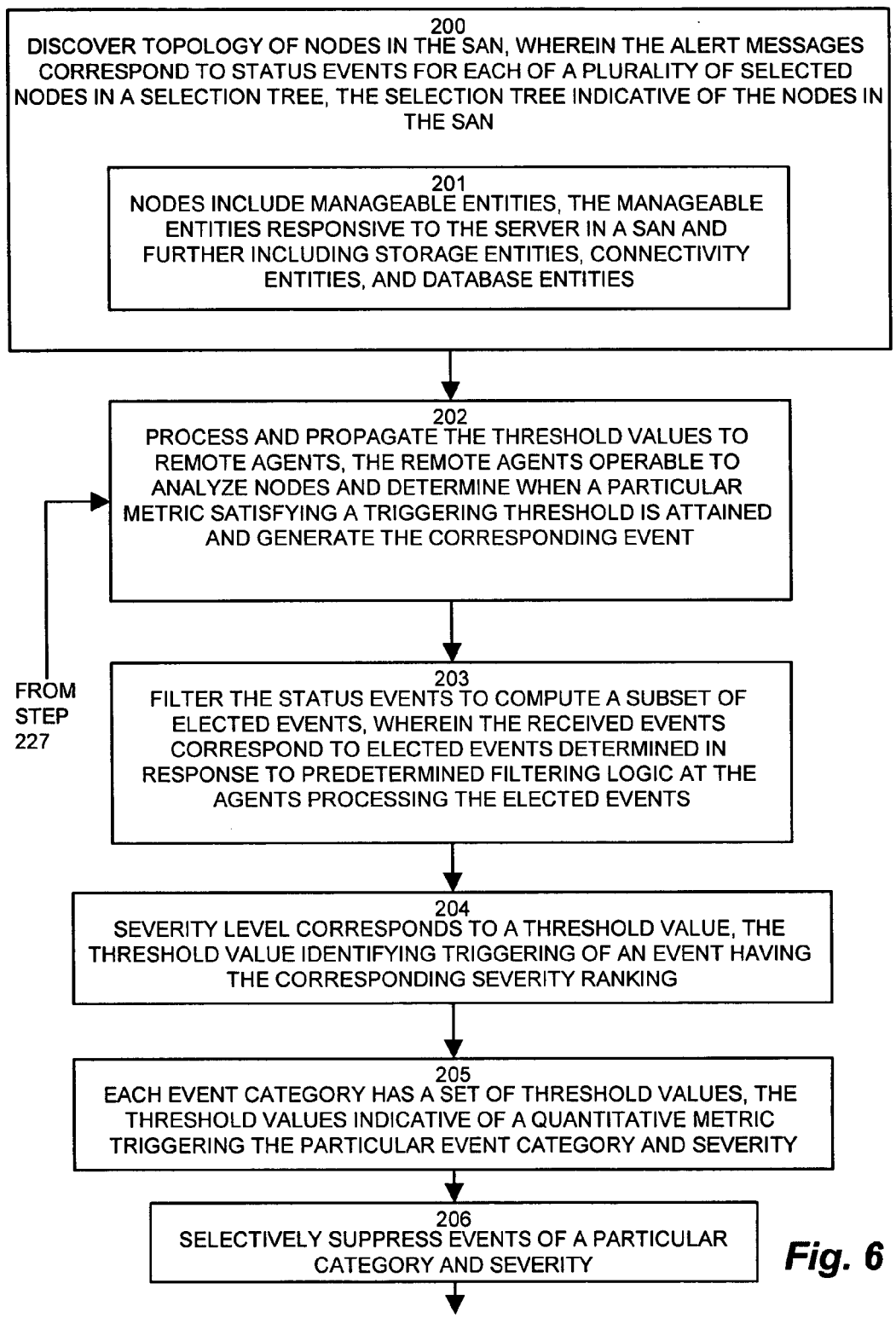
FIGS. 6-9 show a flowchart of status event aggregation, processing, and display in greater detail.
Figure 7:
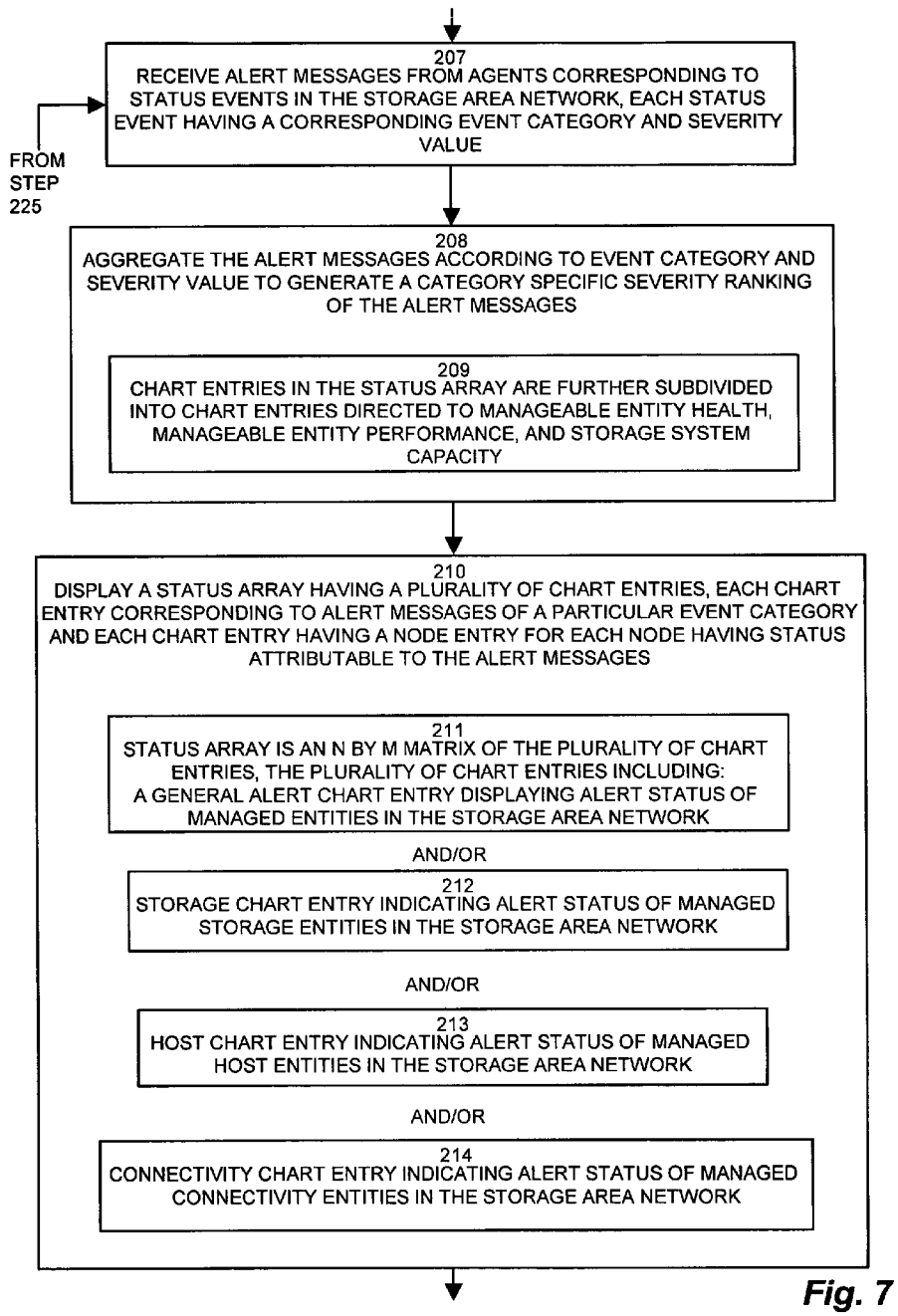
Figure 8:
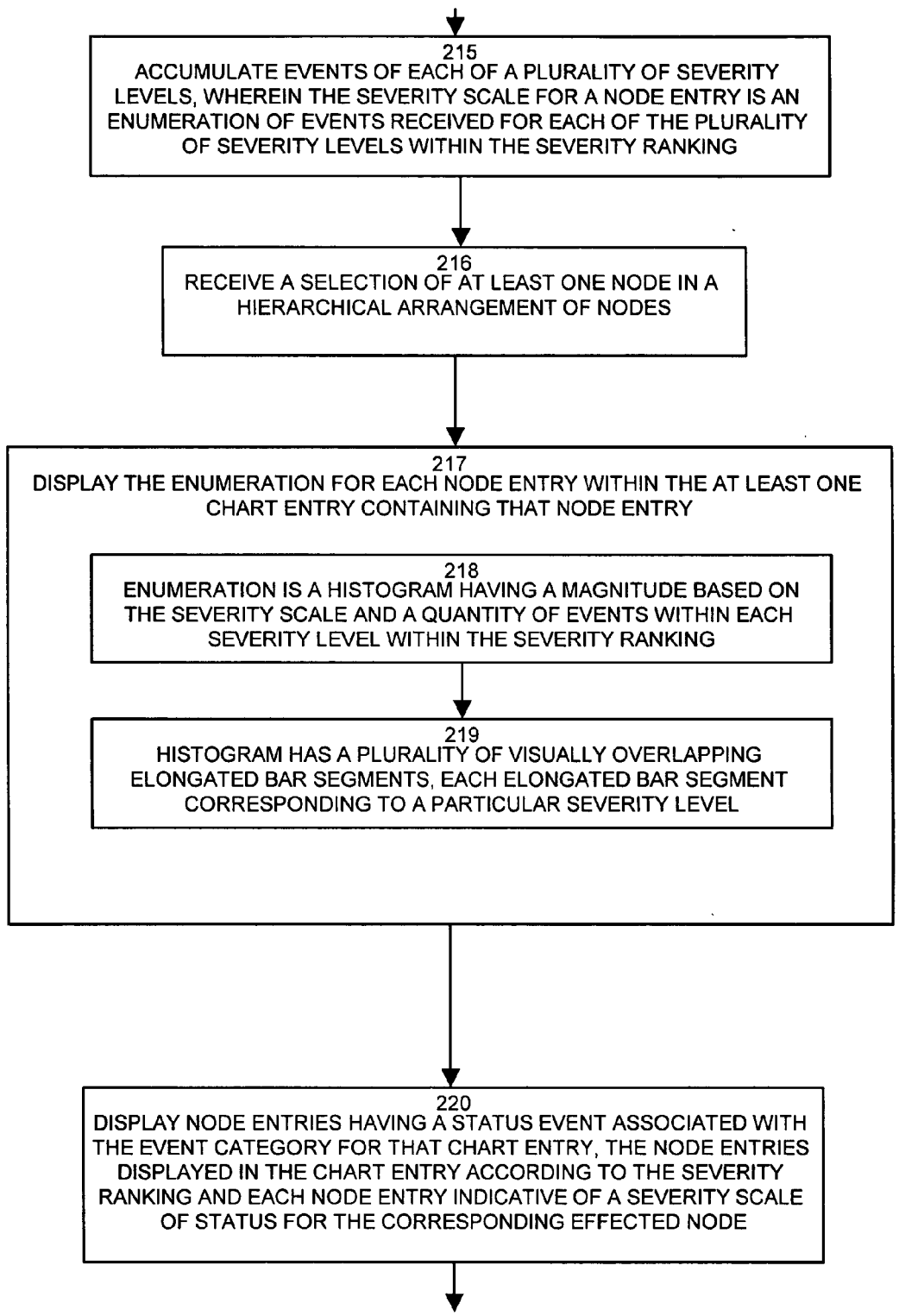

FIG. 5 shows the chart entry portion 14' in the screen display 10 if FIG. 4 in further detail. For each of the respective event categories 26-M, the corresponding chart entry portion 14' includes a node axis 70 and a magnitude axis 72. The node axis 70 lists node entries 16 in rows according to the severity ranking. The magnitude axis 72 indicates a continuum along a range 76, showing the range of a severity scale 24 (i.e. histogram bar) for each of the node entries 16. Each of the node entries 16 includes a node name 18 and a value portion represented by the exemplary histogram bar 20, ordered according to severity scale 24 by the severity ranking 23. The histogram bar 20 further indicates a plurality of levels 22-1-22-3 by overlapping or concatenated bar segments 22-1-22-3. Each of the bar segments is indicative of a quantity of status events corresponding to a particular severity level.

In operation, the histogram bar 20 of each node entry 16 has a length proportional to the total number of status events 56 corresponding to the node 18 of the node entry 16. The levels 22-1-22-3 (22 generally) further subdivide the portion of events attributable to each severity level 22. In the particular exemplary configuration shown, there are five severity levels, including (in order of decreasing imperativity) fatal, critical, warning, minor, and informational. Three shaded areas define the levels 22 in the histogram bar 20. In particular, fatal and critical (red) level 22-3 appear dark gray. Warning and minor (yellow) level 22-2 appear light gray. Informational 22-1 (green) appear black. Alternate shading and level arrangements may be employed in alternate configurations. The most imperative, or segment of greatest severity, appears at the rightmost segment level 22-3 of the histogram bar 20.

FIGS. 6-9 show a flowchart of status event aggregation, processing, and display in greater detail. Referring to FIGS. 1, 2 and 6-9, at step 200, as a part of server initialization or restart, the server discovers a topology of nodes in the storage area network for which to apply the status event (alert) messages. The discovery populates a list of nodes 34 in the SAN in a selection tree 30. The alert messages correspond to status events for each of a plurality of user selected nodes in the selection tree. Therefore, each of the status events 56 corresponds to one of the known nodes 34 in the SAN. The user selects which of the nodes 34 to include in the status array via the selection tree 30, discussed further below.

At step 201, the discovery of the nodes in the SAN includes a variety of elements in the SAN. Such nodes 34 include manageable entities, which are responsive to the server 50 in the SAN and further including storage entities, connectivity entities, and database entities.

At step 202, the initializing includes processing and propagating threshold values to the remote agents 48. Agents 48 are software components which observe the alerts and notifications and transmit the corresponding status event message 56. In a particular configuration, the agents 48 control one or more nodes 34 in the SAN. Further, the agents themselves are nodes 34 for which status events 56 may correspond. The agents 48 receive and store a threshold value 314 (FIG. 10, below) for status events 56 for which the agent 48 may transmit. The remote agents 48 are therefore operable to analyze the nodes 34 and determine when a particular metric satisfying a triggering threshold is attained and generate the corresponding event 56.

At step 203, the agents 48 employ a filter for filtering the status events to compute a subset of elected events. Accordingly, the events 56 received by the server 50 corresponding to elected events determined in response to predetermined filtering logic at the agents 48 processing the elected events 56. The predetermined filtering logic avoids an excessive volume of cumulative or redundant event messages 56 from reaching the aggregator 62. A user or operator may specify the filtering logic to block such events 56. The correlator 60, however, nonetheless sends the filtered events to the database controller 66 for storing in the alert table 54 in the event database 52.

At step 204, for the events not filtered at step 203, the threshold values 308 at the agents 48 associate a severity level 54C to correspond to the threshold values 308 written in step 202. The threshold value of a particular event identifies the threshold for triggering of an event 56 having the corresponding severity ranking 23. Further, at step 205, each event category 26 has a set of threshold values 308 corresponding to each severity level 54C applicable to the event. A particular event 56 often has several severity levels 54C. For example, in a storage volume, a volume full event (i.e. disk running out of space) triggers status event messages 56 of increasing severity as the occupied disk space increasing threshold values. For each event, therefore, the threshold values are indicative of a quantitative metric triggering the particular event category and severity. Such a quantitative metric is typically a numeric threshold, as will be discussed further below with respect to FIG. 10, although alternate configurations may employ additional processing.

At step 206, a user or operator may selectively suppress events 56 of a particular category 26 and severity level 54C. Such an option occurs when a particular event cannot occur or is meaningless at a particular severity level 54C. Certain event messages 56 may need not trigger an informational message, and may correspond only to more serious levels 22. Conversely, a particular event may not have a fatal severity level 22, if the underlying problem needs to be addressed at the critical level 22.

At step 207, the agent sends the alert message 56 and the correlator 60 in the server 50 receives the status event messages in the storage area network 40. The correlator 60 reads and processes each status event for the corresponding event category and severity value.

At step 208, the correlator 60 sends the event messages 56 to the aggregator 62 to aggregate the alert messages according to event category and severity value to generate a category specific severity ranking of the alert messages 56. The aggregator 62 determines which chart entry 14 the message 56 belongs to from the category, accordingly, at step 209, the chart entries receiving the messages 56 in the status array are further subdivided into chart entries directed to manageable entity health (26-1, 26-2, 26-3), manageable entity performance (26-4, 26-5, 26-6) and storage system capacity (26-7, 26-8).

At step 210, the user console 42, in response to the server 50, displays the status array 12 and the corresponding of chart entries 14. Each chart entry 14 includes an indication of alert messages 56 of a particular event category 26. For each chart entry 14, there is a node entry 16 row for each node having status attributable to the alert messages 56. Each node entry includes the name 18 of the affected node and a status bar 20 indicative of the status event messages, discussed further below. Note that there are multiple events within a particular event category 26. Each node entry 16 is expandable to an expanded status report 320, discussed below with respect to FIG. 10, to ascertain the individual events within the category 26.

At step 211, in the exemplary embodiment shown, the status array is an N by M matrix of the chart entries 14. Particular implementations may include chart entries from among many event categories. In the exemplary embodiment shown, chart entries 14 are selected as salient indications of overall storage area network health and optimal performance. The exemplary chart entries 14 include at least one category 26, in which the plurality of chart entries collectively includes, at step 211a general alert chart entry 14-1 displaying alert status of managed entities in the storage area network; at step 212, a storage chart entry 14-4 indicating alert status of managed storage entities in the storage area network; at step 213 a host chart entry 14-5 indicating alert status of managed host entities in the storage area network, and at step 214, the chart entry 14-6 is a connectivity chart entry indicating alert status of managed connectivity entities in the storage area network.

At step 215, the aggregator computes the severity scale from a received set of messages in a category. Therefore, the aggregator 62 accumulates event messages 56 of each of a plurality of severity levels 22, in which the severity scale for a node entry 16 is an enumeration of events 56 received for each of the plurality of severity levels 22 within the severity scale 24. In other words, the severity scale 24 for a particular node 18 in a node entry 16 is a scalable value (i.e. number) encompassing event messages 56 of the various severity levels 22 which can be ordered with respect to the severity scale 24 for other node entries 16. The severity scale is then used to rank the node entries 16 from most severe to least severe, thus enabling the operator or user to observe the node having the most imperative condition or status at the top of the chart entry, nodes 34 of less imperative status below, and possibly nodes with relatively benign severity scales falling off into a scroll down area below the chart entry 14 shown on the GUI screen 10.

At step 216, the user or operator selects a selection group 32 from the selection tree. Accordingly, the aggregator 62 receiving the selection of at least one node in the hierarchical arrangement of nodes 34 in the selection tree, and limits the output status array 12 to those nodes 34.

At step 217, the user console 42 displays, via the GUI 10, the enumeration for each node entry on the chart entry corresponding that node entry (i.e. for that category 26). In the embodiment shown, the enumeration is a histogram bar 24 representing the computed severity scale. Alternate implementations may employ other representations, such as a circular (pie) graph or numerical formats.

At step 218, the console 42 displays a histogram bar 24 having a magnitude based on the severity scale and a quantity of events within each severity level 22 within the severity ranking of node entries 16 on the particular chart entry 14. At step 219, the histogram bar 24 has a plurality of concatenated, or visually overlapping, elongated bar segments, each elongated bar segment corresponding to a particular severity level 22-1, 22-2, 22-3. In the particular configuration shown, three severity levels corresponding to colors of the histogram bar are employed, and encompass five threshold levels. A red (dark gray) segment 22-3 indicates fatal or critical severity. A yellow (light gray) segment 22-2 indicates error or warning severity, and a green (black) 22-1 segment indicates an informational severity level. Therefore, the single histogram bar 24 indicates the magnitude of the status event quantity, and the segments 22-1, 22-2, and 22-2 indicate the apportionment to the different severity levels within the node entry 16.

At step 220, the GUI 10 displays, for each chart entry, the node entries 16 in the chart entry 26 according to the severity ranking in which each node entry 16 is indicative of a severity scale of aggregated status for the corresponding effected node 34. Therefore, the nodes having the greatest number of fatal or critical events 56 will have the longest red (dark gray) segment and will appear at the top of the chart entry. Other node entries 16 follow in order of decreasing overall severity as per the severity ranking.

At steps 221-223, the simultaneous operation of the multiple chart entries 14 in the status array 12 is described in further detail. At step 221, receiving the status event messages 56, aggregating the messages 56, displaying the status array, and displaying the node entries in the chart entries occur in relation to the selected node(s) (selection group) in order to display the simultaneous status of nodes in a storage area network. At step 222, the aggregator 62 computes, for each node entry 16, the severity scale for each node according to a predetermined severity metric. Each chart entry 14 has a vertical manageable entity axis 70 arranged, for each node 34, according to increasing values of severity scale, therefore denoting the severity ranking for each node 34 included in the chart entry. At step 223, each chart entry 14 has a horizontal magnitude axis 72 indicative of a relative range 76 of the quantity of status events 56 within each of the severity levels 22 corresponding to a plurality of node entries 16 reflected in the chart entry 14. Therefore, the magnitude axis 72 of each chart entry 14 has a maximum range 72 which adjusts depending on the maximum value of the severity scale, or length of the histogram bar 24.

At step 224, the sampling or polling nature of the server is described. The server periodically, in response to a sampling, polling, or interrupt driven cycle, recomputes the status array 12 and chart entries 14. The server checks for expiration of such a sampling interval, and if it has elapsed, control reverts to step 207, as shown in step 225, to refresh the display 10.

If the sampling interval has not expired, the server performs a check, at step 226, for user input to change thresholds. If a user elects to change thresholds, then control reverts to step 202, as shown at step 227. If there is no user input at step 226, then a check is performed to determine if a user elects status clarification, or expanded status, of a particular node entry 16, otherwise known as a "drill down" operation. If no user input occurs, control reverts to step 224 for subsequent activity. Otherwise, at step 229, the server receives the user input corresponding to selection of at least one node entry from among the node entries displayed in the status array. At step 230, the server displays an expanded menu of status options for the selected node entry 16. At step 231, the server receives the user input and displays an expanded status report corresponding to the expanded menu of additional drill down status options, discussed further below with respect to FIG. 11.

Figure 9:
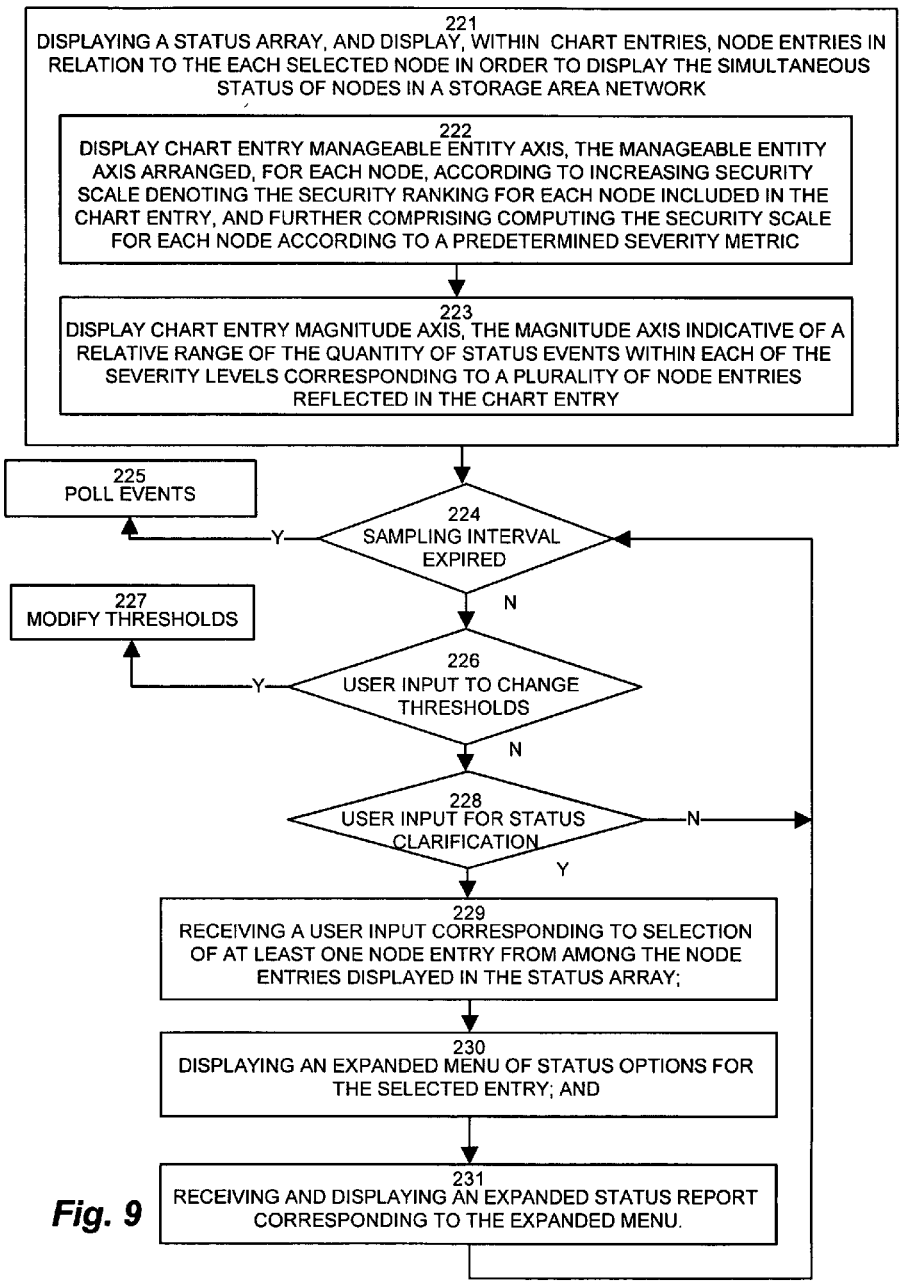
Figure 10:
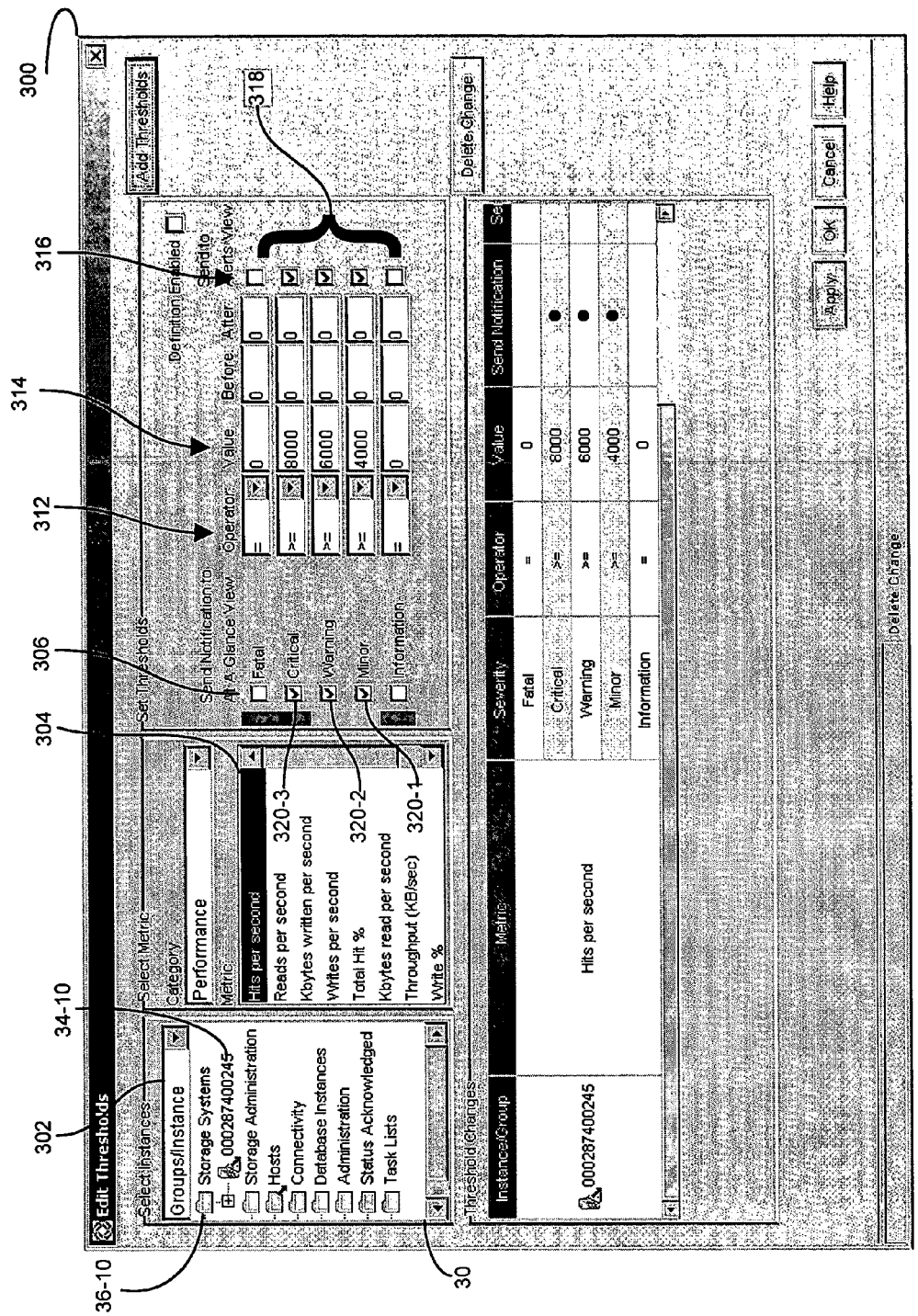
FIG. 10 shows an example of a GUI screen for threshold selection in the GUI of FIG. 1.

FIG. 10 shows an example of a GUI screen for threshold selection in the GUI of FIG. 1. As indicated above, the aggregator 62 determines the severity level 22 of each event by a set of thresholds corresponding to the metric to be measured. Referring to FIG. 9, an edit/select thresholds screen is shown. A set of threshold values 302 defines the range 76 for each threshold severity level 22. For example, in a storage volume, events may define a number of available free sectors to be at a warning level at 90%, at critical at 95%, and fatal at 98%. In a system with 100K blocks, the warning threshold would be set at 90K, critical at 95K, and fatal at 98K block occupancy.

In the example shown in FIG. 9, a user defines a new event. The new event is for node 34-10, which is an expansion of the storage system entity icon 36, as shown in the selection tree 30. An event category selection window 302 select the performance event category, and since the node is a storage system node 34-10, the event pertains to the storage performance event category 26-4 (FIG. 1). A category metric 304 of hits per second determines the criteria for computing the threshold level. A severity level selection 306 and the threshold value selection 308 define the demarcating values between the severity levels which trigger the alert and generate the respective event. An operator field 312 defines the relation of the threshold value 308 to the measured value from the node 34-10. In the example shown, hits per second generate a minor status event 320-3 at 4000/sec., a warning status event 320-2 at 6000/sec., and a critical status event 320-3 at 8000/sec.

A severity level selection 306 activates and deactivates alert generation at a particular level 22, and a suppression selection field 316 indicates whether the agent should send the events to the aggregator 62 in the server 50 for inclusion in the status array 12 (in this case, the chart entry 14-4). Suppression of certain severity levels avoids flooding the aggregator 62 with excessive and/or cumulative information and redundant traffic. Note that the suppression field 316 suppresses inclusion in the chart entry 14-4, but does not prevent the status event from inclusion in the table 54, to maintain system integrity. The current/modified status event criteria is also shown in an echo/threshold window 318.

Figure 11:
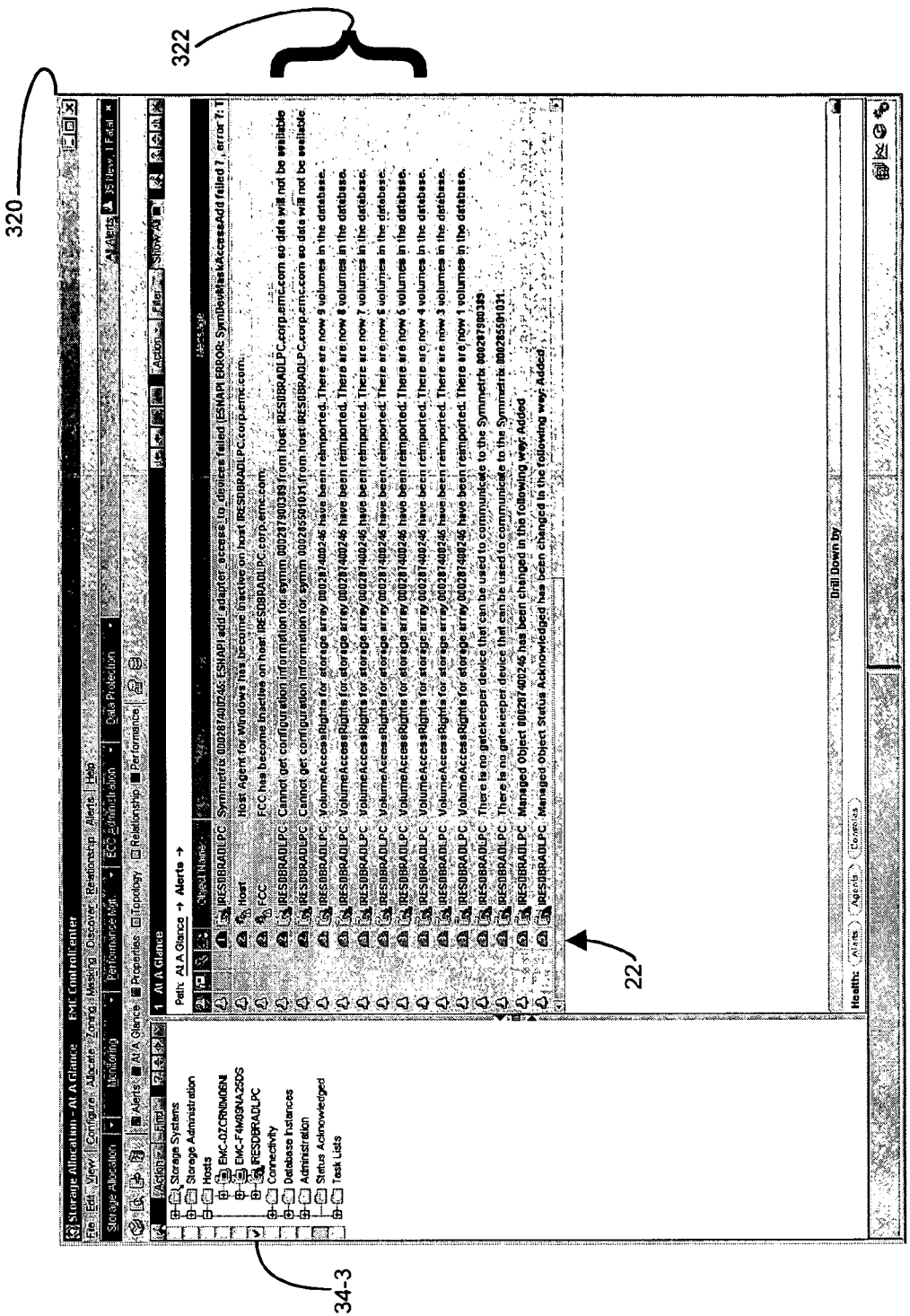
FIG. 11 shows an example of a GUI screen for detailed status about a particular node in the screen of FIG. 1.

FIG. 11 shows an example of a GUI screen for extended status about a particular node in the screen of FIG. 1. Referring to FIGS. 1 and 10, an extended status window 320 includes a detailed breakdown of events corresponding to a particular node 34. A user may display the extended status window 320 for a particular node 34 by clicking on the node entry 16 on the status array 12 screen 10. The extended status window 320 then displays, for the selected node 34-3, an event detail 322 arranged by severity level 22.

The information distribution system disclosed herein may encompass a variety of alternate deployment environments. In a particular configuration, the exemplary SAN management application discussed may be the EMC Control Center application (ECC), marketed commercially by EMC corporation of Hopkinton, Mass., assignee of the present application.

Those skilled in the art should readily appreciate that the programs and methods for gathering and monitoring the simultaneous status of nodes in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for gathering and monitoring the simultaneous status of nodes in a storage area network has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for gathering and monitoring the simultaneous status of nodes in a storage area network (SAN), comprising:

receiving alert messages corresponding to status events in the storage area network, each status event having a corresponding event category and severity value, the storage area network having nodes that include manageable entities, the manageable entities responsive to a server in the storage area network, the nodes including storage entities, connectivity entities, and database entities;

aggregating the alert messages according to event category and severity value to generate a category specific severity ranking of the alert messages;

displaying a status array having a plurality of chart entries, each chart entry corresponding to alert messages of a particular event category and each chart entry having a node entry for each node having status attributable to the alert messages, the status array is an N by M matrix of the plurality of chart entries, the plurality of chart entries including:

i) a general alert chart entry displaying alert status of managed entities in the storage area network;

ii) a storage chart entry indicating alert status of managed storage entities in the storage area network;

iii) a host chart entry indicating alert status of managed host entities in the storage area network; and iv) a connectivity chart entry indicating alert status of managed connectivity entities in the storage area network;

receiving a selection of at least one node in the N by M status array matrix of the plurality of chart entries;

displaying the status array including simultaneously listing, for each category type, nodes having status events of greatest severity displaying, within at least one chart entry, node entries in relation to the selected at least one node in order to display the simultaneous status of nodes in the storage area network; and displaying, within at least one chart entry, node entries having a status event associated with the event category for that chart entry, the node entries displayed in the chart entry according to the severity ranking and each node entry indicative of a severity scale of status for the corresponding effected node.

2. The method of claim 1 wherein displaying, within the at least one chart entry, comprises:

accumulating events of each of a plurality of severity levels, each severity level representing a range of severity values such that a given status event with a given severity value has a corresponding severity level when the given severity value of the given status event is within a range of severity values for the corresponding severity level, wherein the severity scale for a node entry is an enumeration of events received for each of the plurality of severity levels within the severity ranking, the severity ranking determined by the severity scale for each node entry;

displaying the enumeration of events received for each node entry within the at least one chart entry containing that node entry, the enumeration of events received being displayed in an order according to the severity ranking; and wherein the alert messages are received from remote agents operating within a storage area network.

3. The method of claim 2 wherein the enumeration is a histogram having a magnitude based on the severity scale and a quantity of events within each severity level within the severity ranking.

4. The method of claim 3 wherein the histogram has a plurality of visually overlapping elongated bar segments, each elongated bar segment corresponding to a particular severity level.

5. The method of claim 1 further including discovering a topology of nodes in the SAN, wherein the alert messages correspond to status events for each of a plurality of selected nodes in a selection tree, the selection tree indicative of the nodes in the SAN.

6. The method of claim 1 further including filtering the status events to compute a subset of elected events, wherein the received events correspond to elected events determined in response to predetermined filtering logic at the agents processing the elected events.

7. The method of claim 1 wherein each chart entry has a magnitude axis, the magnitude axis indicative of a relative range of the quantity of status events within each of the severity levels corresponding to a plurality of node entries reflected in the chart entry.

8. The method of claim 1 wherein each chart entry has a manageable entity axis, the manageable entity axis arranged, for each node, according to increasing severity scale denoting the severity ranking for each node included in the chart entry, and further comprising computing the severity scale for each node according to a predetermined severity metric.

9. The method of claim 1 wherein the severity level corresponds to a threshold value, the threshold value identifying triggering of an event having the corresponding severity level.

10. The method of claim 1 wherein each event in an event category has a set of threshold values, the threshold values indicative of a quantitative metric triggering the particular event and severity.

11. The method of claim 10 further comprising processing and propagating the threshold values to remote agents, the remote agents operable to analyze nodes and determine when a particular metric satisfying a triggering threshold is attained and generate the corresponding event.

12. The method of claim 1 wherein the nodes further comprise manageable entities, the manageable entities responsive to the server in a SAN and further including storage entities, connectivity entities, and database entities.

13. The method of claim 1 further comprising selectively suppressing events of a particular category and severity.

14. The method of claim 1 wherein the chart entries in the status array are further subdivided into chart entries directed to manageable entity health, manageable entity performance, and storage system capacity.

15. The method of claim 1 comprising:
receiving a selection of at least one node in a hierarchical arrangement of nodes; and
wherein receiving, aggregating, displaying a status array, and displaying, within at least one chart entry, node entries are performed in relation to the selected at least one node in order to display the simultaneous status of nodes in a storage area network.

16. The method of claim 1 further comprising
receiving a user input corresponding to selection of at least one node entry from among the node entries displayed in the status array;
displaying an expanded menu of status options for the selected entry; and
receiving a response to the menus of status options and displaying an expanded status report corresponding to the expanded menu.

17. A network monitoring device for gathering and monitoring the simultaneous status of nodes in a storage area network (SAN), comprising:
a server having a correlator operable to receive alert messages corresponding to status events in the storage area network, each status event having a corresponding event category and severity value, the storage area network having nodes that include manageable entities, the manageable entities responsive to a server in the storage area network, the nodes including storage entities, connectivity entities, and database entities;
an aggregator operable to aggregate the alert messages according to event category and severity value to generate a category specific severity ranking of the alert messages; and
an operator console operable to display a status array having a plurality of chart entries, each chart entry corresponding to alert messages of a particular event category and each chart entry having a node entry for each node having status attributable to the alert messages, the status array is an N by M matrix of the plurality of chart entries, the plurality of chart entries including:
i) a general alert chart entry displaying alert status of managed entities in the storage area network;
ii) a storage chart entry indicating alert status of managed storage entities in the storage area network;
iii) a host chart entry indicating alert status of managed host entities in the storage area network; and
iv) a connectivity chart entry indicating alert status of managed connectivity entities in the storage area network;
the console further operable to receive a selection of at least one node in the N by M status array matrix of the plurality of chart entries, display the status array including simultaneously listing, for each category type, nodes having status events of greatest severity, and display, within at least one chart entry, node entries in relation to the selection of at least one node in order to display the simultaneous status of nodes in the storage area network; and
the console further operable to display, within at least one chart entry, node entries having a status event associated with the event category for that chart entry, the node entries displayed in the chart entry according to the severity ranking and each node entry indicative of a severity scale of status for the corresponding effected node.

18. The network monitoring device of claim 17 wherein the accumulator is further operable to:
accumulate events of each of a plurality of severity levels, each severity level representing a range of severity values such that a given status event with a given severity value has a corresponding severity level when the given severity value of the given status event is within a range of severity values for the corresponding severity level, wherein the severity scale for a node entry is an enumeration of events received for each of the plurality of severity levels within the severity ranking, the severity ranking determined by the severity scale for each node entry;
display, within the at least one chart entry, the enumeration of events received for each node entry within the at least one chart entry containing that node entry, the enumeration of events received being displayed in an order according to the severity ranking;
wherein the enumeration is a histogram having a magnitude based on the severity scale and a quantity of events within each severity level within the severity ranking; and
wherein the histogram has a plurality of visually overlapping elongated bar segments, each elongated bar segment corresponding to a particular severity level.

19. The network monitoring device of claim 17 wherein each chart entry has a magnitude axis, the magnitude axis indicative of a relative range of the quantity of status events within each of the severity levels corresponding to a plurality of node entries reflected in the chart entry.

20. The network monitoring device of claim 17 wherein each chart entry has a manageable entity axis, the manageable entity axis arranged, for each node, according to increasing severity scale denoting the severity ranking for each node included in the chart entry, and further comprising computing the severity scale for each node according to a predetermined severity metric.

21. The network monitoring device of claim 17 wherein the severity level corresponds to a threshold value, the threshold value identifying triggering of an event having the corresponding severity level.

22. The network monitoring device of claim 17 wherein each event in an event category has a set of threshold values, the threshold values indicative of a quantitative metric triggering the particular event and severity; and
wherein the server is further operable to processing and propagating the threshold values to remote agents, the remote agents operable to analyze nodes and determine when a particular metric satisfying a triggering threshold is attained and generate the corresponding event.

23. The network monitoring device of claim 17 wherein the server is operable to selectively suppress events of a particular category and severity.

24. The network monitoring device of claim 17 wherein the chart entries in the status array are further subdivided into chart entries directed to manageable entity health, manageable entity performance, and storage system capacity.

25. The network monitoring device of claim 17 wherein the server is further operable to receive a selection of at least one node in a hierarchical arrangement of nodes, and display, within at least one chart entry, node entries in relation to the selected at least one node in order to display the simultaneous status of nodes in a storage area network.

26. The network monitoring device of claim 17 wherein the server is further operable to:
- receive a user input corresponding to selection of at least one node entry from among the node entries displayed in the status array;
- display an expanded menu of status options for the selected entry; and
- display an expanded status report corresponding to the expanded menu and a response to the menu of status options.

27. A computer program product having a computer readable medium operable to store computer program logic embodied in computer program code encoded thereon for gathering and monitoring the simultaneous status of nodes in a storage area network (SAN), comprising:
- computer program code for receiving alert messages corresponding to status events in the storage area network, each status event having a corresponding event category and severity value, the storage area network having nodes that include manageable entities, the manageable entities responsive to a server in the storage area network, the nodes including storage entities, connectivity entities, and database entities;
- computer program code for aggregating the alert messages according to event category and severity value to generate a category specific severity ranking of the alert messages;
- computer program code for displaying a status array having a plurality of chart entries, each chart entry corresponding to alert messages of a particular event category and each chart entry having a node entry for each node having status attributable to the alert messages, the status array is an N by M matrix of the plurality of chart entries, the plurality of chart entries including:
  i) a general alert chart entry displaying alert status of managed entities in the storage area network;
  ii) a storage chart entry indicating alert status of managed storage entities in the storage area network;
  iii) a host chart entry indicating alert status of managed host entities in the storage area network; and
  iv) a connectivity chart entry indicating alert status of managed connectivity entities in the storage area network;
- computer program code for receiving a selection of at least one node in the N by M status array matrix of the plurality of chart entries;
- computer program code for displaying the status array including simultaneously listing, for each category type, nodes having status events of greatest severity;
- computer program code for displaying, within at least one chart entry, node entries in relation to the selected at least one node in order to display the simultaneous status of nodes in the storage area network; and
- computer program code for displaying, within at least one chart entry, node entries having a status event associated with the event category for that chart entry, the node entries displayed in the chart entry according to the severity ranking and each node entry indicative of a severity scale of status for the corresponding effected node.

28. The method of claim 1, wherein the severity scale for each node entry is an aggregate value representative of a number of alert messages received at each node entry for a given sampling interval, wherein each node entry is weighted with respect to a corresponding severity level for each alert message, each severity level representing a range of severity values such that a given status event with a given severity value has a corresponding severity level when the given severity value of the given status event is within a range of severity values for the corresponding severity level.

29. The network monitoring device of claim 17, wherein the severity scale for each node entry is an aggregate value representative of a number of alert messages received at each node entry for a given sampling interval, wherein each node entry is weighted with respect to a corresponding severity level for each alert message, each severity level representing a range of severity values such that a given status event with a given severity value has a corresponding severity level
- when the given severity value of the given status event is within a range of severity values for the corresponding severity level.

30. The computer program product of claim 27, wherein the severity scale for each node entry is an aggregate value representative of a number of alert messages received at each node entry for a given sampling interval, wherein each node entry is weighted with respect to a corresponding severity level for each alert message, each severity level representing a range of severity values such that a given status event with a given severity value has a corresponding severity level when the given severity value of the given status event is within a range of severity values for the corresponding severity level.

31. A method for gathering and monitoring the simultaneous status of nodes in a storage area network (SAN), comprising:
- discovering a topology of nodes in the SAN, wherein the nodes comprise manageable entities, the manageable entities responsive to a server in the SAN and further including storage entities, connectivity entities, and database entities;
- propagating threshold values to remote agents, wherein responsive to the threshold values, the remote agents operable to analyze nodes and determine when a particular metric satisfying a triggering threshold is attained, and to generate a corresponding status event as an alert message;
- receiving alert messages, from the remote agents, corresponding to status events in the storage area network, each status event having a corresponding event category and severity value;
- storing status events in an event repository;
- aggregating the alert messages according to event category and severity value to generate a category specific severity ranking of the alert messages;
- displaying a status array having a plurality of chart entries, each chart entry corresponding to alert messages of a particular event category and each chart entry having a node entry for each node having status attributable to the alert messages, the status array is an N by M matrix of the plurality of chart entries, the plurality of chart entries including:
  i) a general alert chart entry displaying alert status of managed entities in the storage area network;
  ii) a storage chart entry indicating alert status of managed storage entities in the storage area network;
  iii) a host chart entry indicating alert status of managed host entities in the storage area network; and
  iv) a connectivity chart entry indicating alert status of managed connectivity entities in the storage area network;
- displaying the status array including simultaneously listing, for each category type, nodes having status events of greatest severity;
- displaying, within at least one chart entry, node entries in relation to the selected at least one node in order to display the simultaneous status of nodes in the storage area network; and displaying, within at least one chart entry, node entries having a status event associated with the event category for that chart entry, the node entries displayed in the chart entry according to the severity ranking and each node entry indicative of a severity scale of status for the corresponding effected node, wherein the severity scale for a node entry is an enumeration of events received for each of a plurality of severity levels with the severity ranking.

32. The method of claim 31 wherein the chart entries in the status array are further subdivided into chart entries directed to manageable entity health, manageable entity performance, and storage system capacity; and in response to a user request, the remote agents selectively suppressing events of a particular category and severity.

33. The method of claim 4, wherein displaying the enumeration of events includes displaying a histogram bar, for each node entry, that has a length proportional to a total number of status events corresponding to a node of the node entry.

34. The method of claim 33, wherein displaying the enumeration of events includes displaying each elongated bar segment indicating a quantity of status events corresponding to a corresponding severity level.

35. The method of claim 34, wherein each histogram bar has a maximum range that adjusts depending on a length of each histogram bar.

36. The method of claim 7, wherein the magnitude axis of each chart entry has a maximum range that adjusts depending on a maximum value of the severity levels.

37. The method of claim 31, further comprising:

accumulating events of each of a plurality of severity levels, each severity level representing a range of severity values such that a given status event with a given severity value has a corresponding severity level when the given severity value of the given status event is within a range of severity values for the corresponding severity level, wherein the severity scale for a node entry is an enumeration of events received for each of the plurality of severity levels within the severity ranking, the severity ranking determined by the severity scale for each node entry;

propagating threshold values to remote agents, wherein responsive to the threshold values, the remote agents operable to analyze nodes and determine when a particular metric satisfying a triggering threshold is attained, and to generate a corresponding status event as an alert message; and in response to a user request, the remote agents selectively suppressing events of a particular category and severity.

38. The method of claim 37, wherein the enumeration is a histogram having a magnitude based on the severity scale and a quantity of events within each severity level within the severity ranking; and wherein each chart entry has a manageable entity histogram bar, the manageable entity histogram bar arranged, for each node, according to increasing severity scale denoting the severity ranking for each node included in the chart entry, and further comprising computing the severity scale for each node according to a predetermined severity metric.

39. The method of claim 38, wherein each event in an event category has a set of threshold values, the threshold values indicative of a quantitative metric triggering the particular event and severity; and further comprising processing and propagating the threshold values to remote agents, the remote agents operable to analyze nodes and determine when a particular metric satisfying a triggering threshold is attained and generate the corresponding event.

* * * * *